Figure 12:
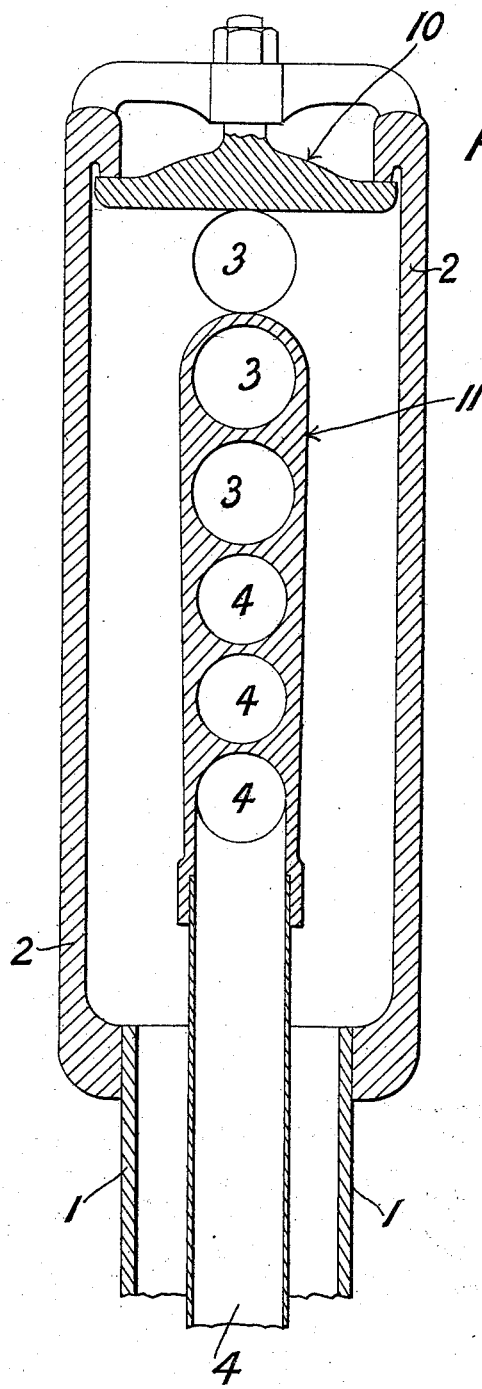

No. 706,787. Patented Aug. 12, 1902.
N. VICENTE.
WATER TUBE BOILER.
(Application filed Feb. 12, 1902.)
(No Model.) 12 Sheets—Sheet 1.
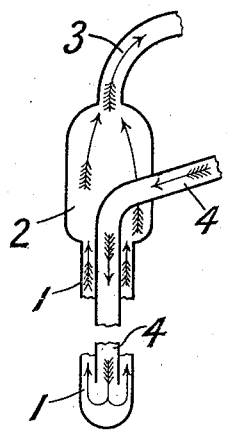
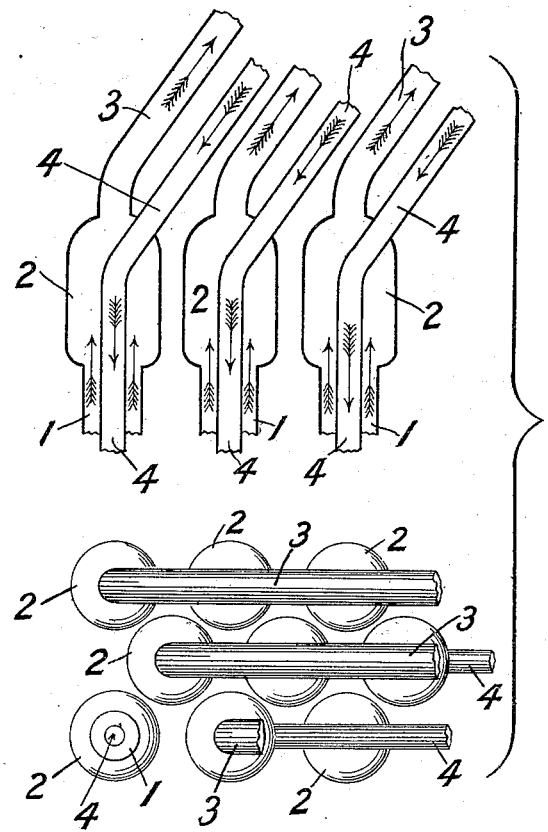

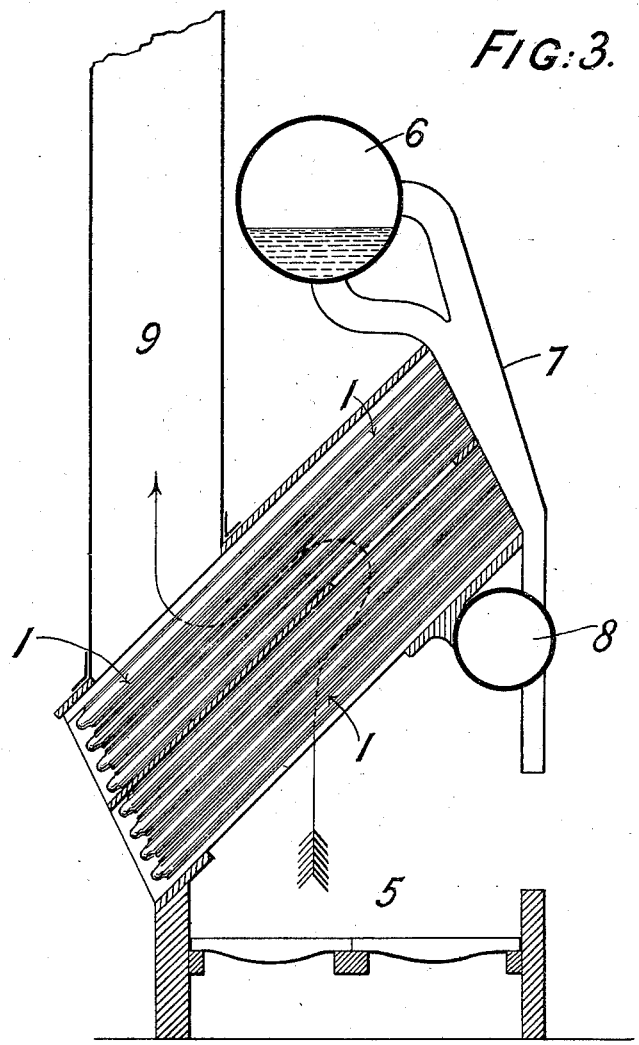

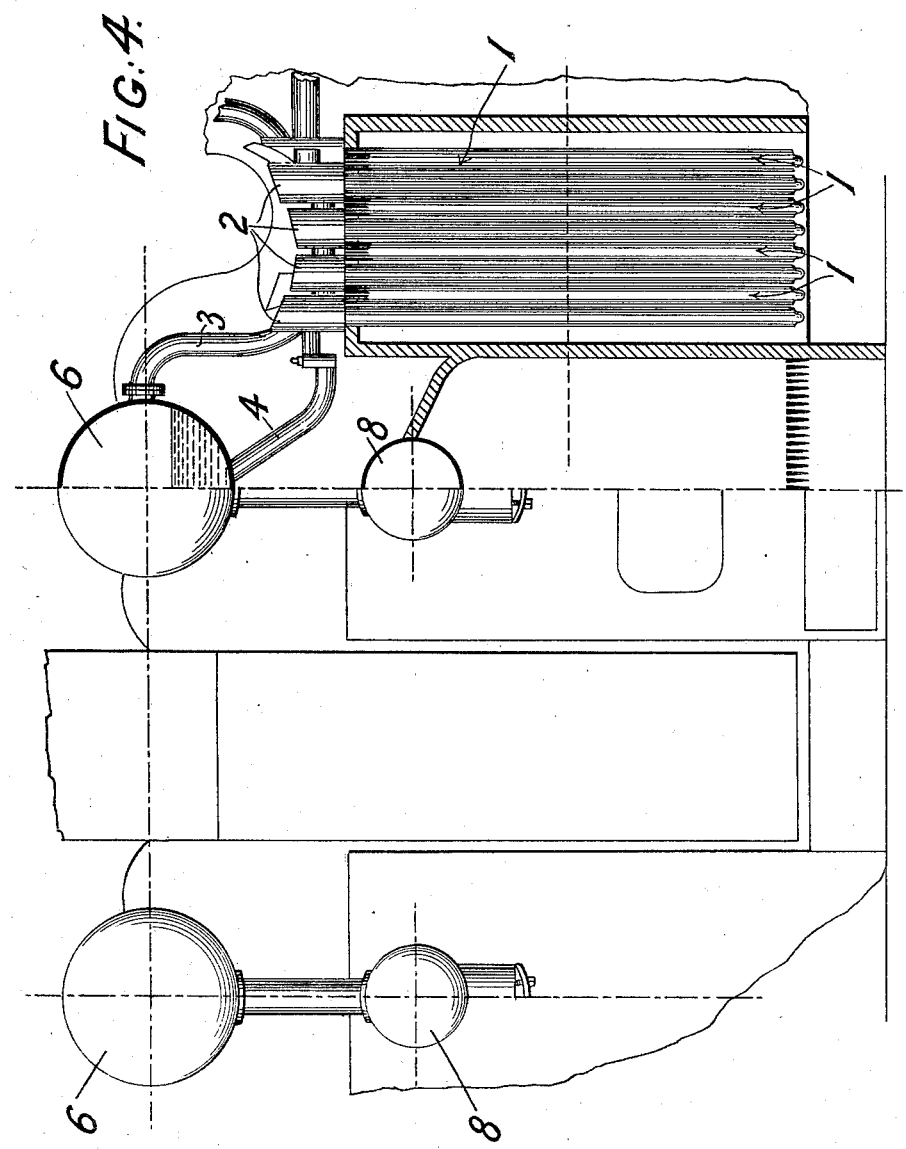

No. 706,787. Patented Aug. 12, 1902.
N. VICENTE.
WATER TUBE BOILER.
(Application filed Feb. 12, 1902.)
(No Model.) 12 Sheets—Sheet 4.
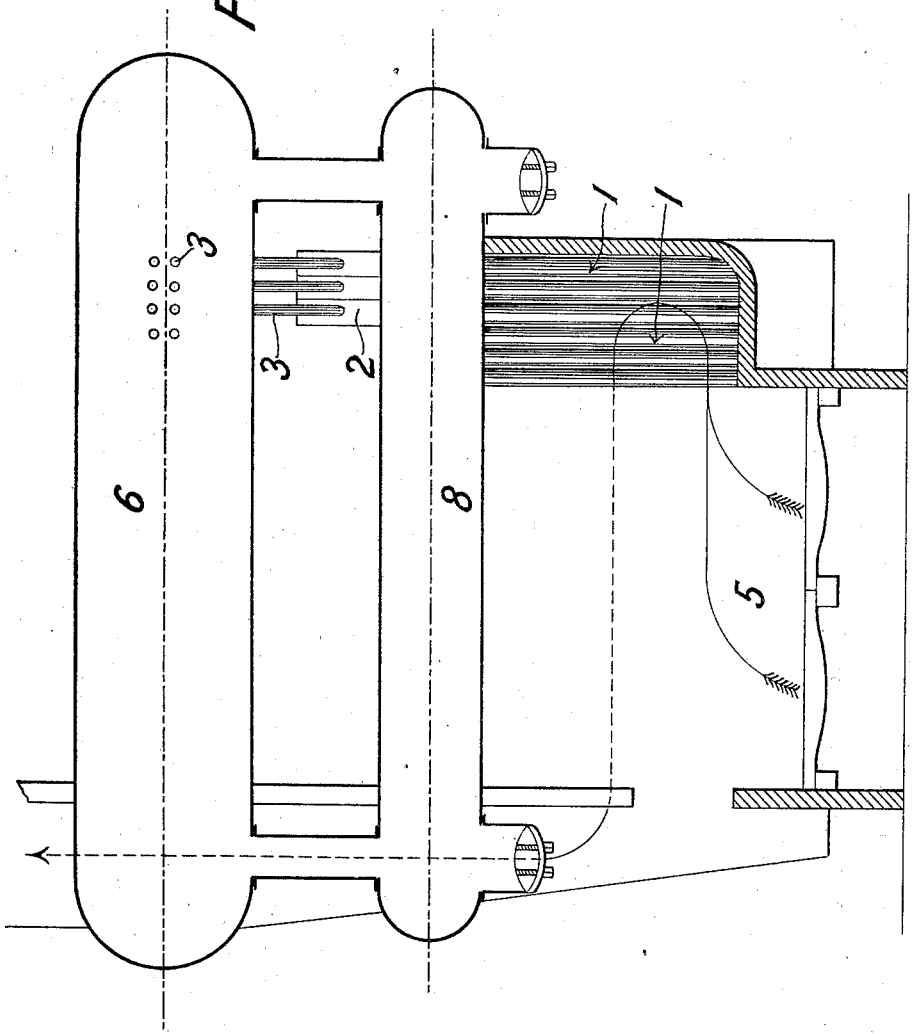

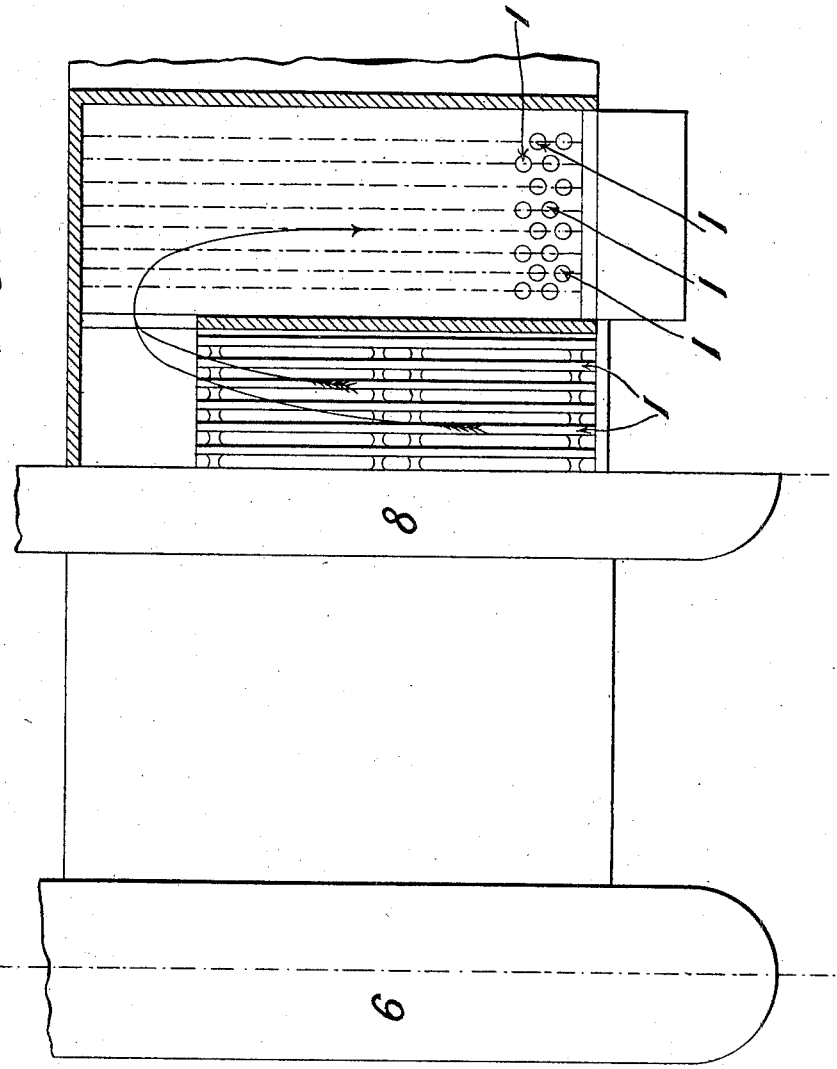

No. 706,787. Patented Aug. 12, 1902.
N. VICENTE.
WATER TUBE BOILER.
(Application filed Feb. 12, 1902.)
(No Model.) 12 Sheets—Sheet 6.
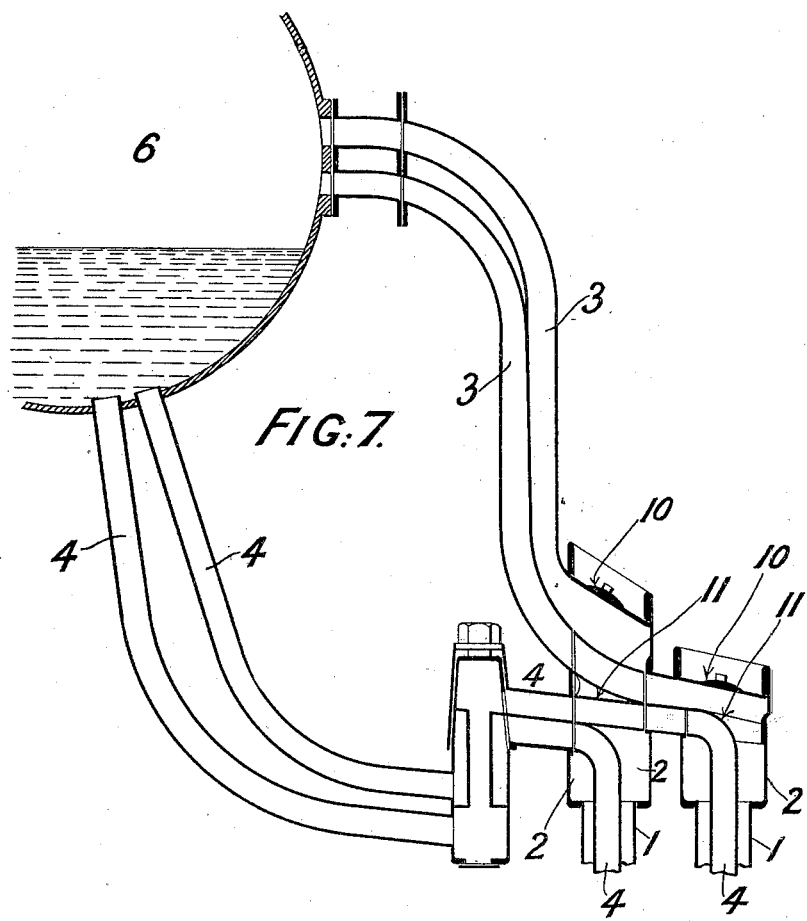
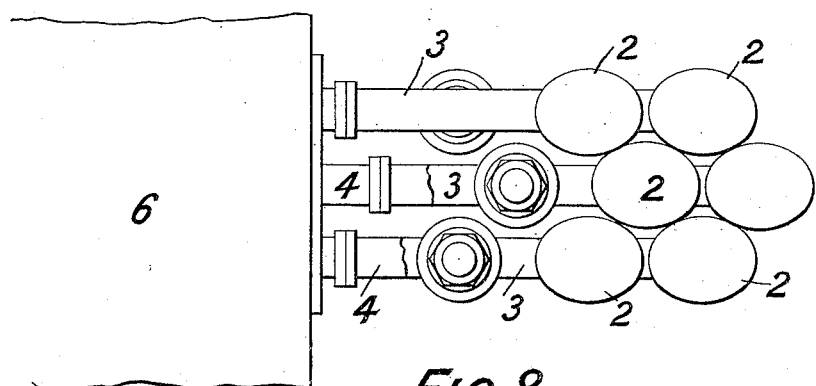

No. 706,787. Patented Aug. 12, 1902.
N. VICENTE.
WATER TUBE BOILER.
(Application filed Feb. 12, 1902.)
(No Model.) 12 Sheets—Sheet 7.
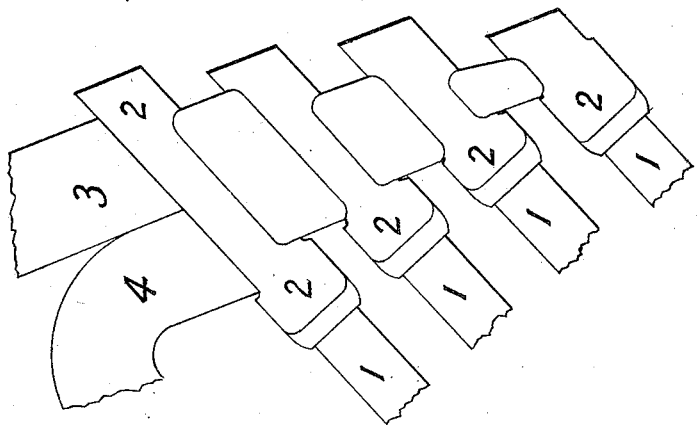
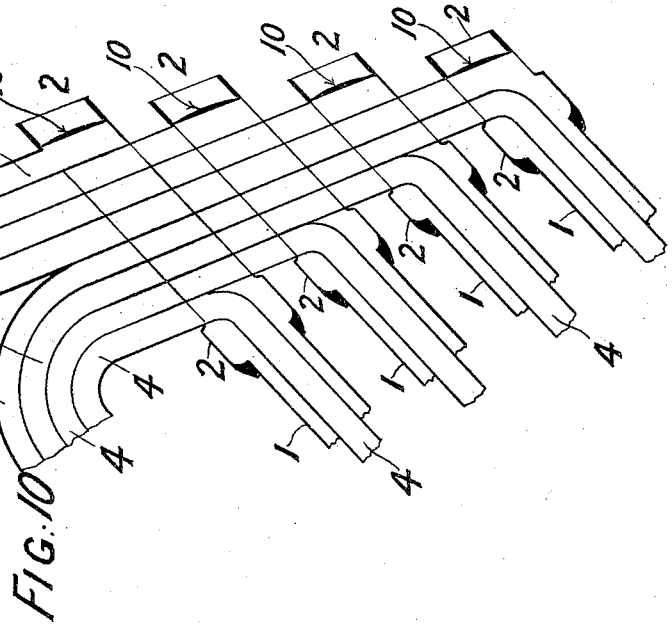
Witnesses: Inventor:
J. Staib Nemesio Vicente
Chas H Smith per L. W. Serrell & Son
Attys.

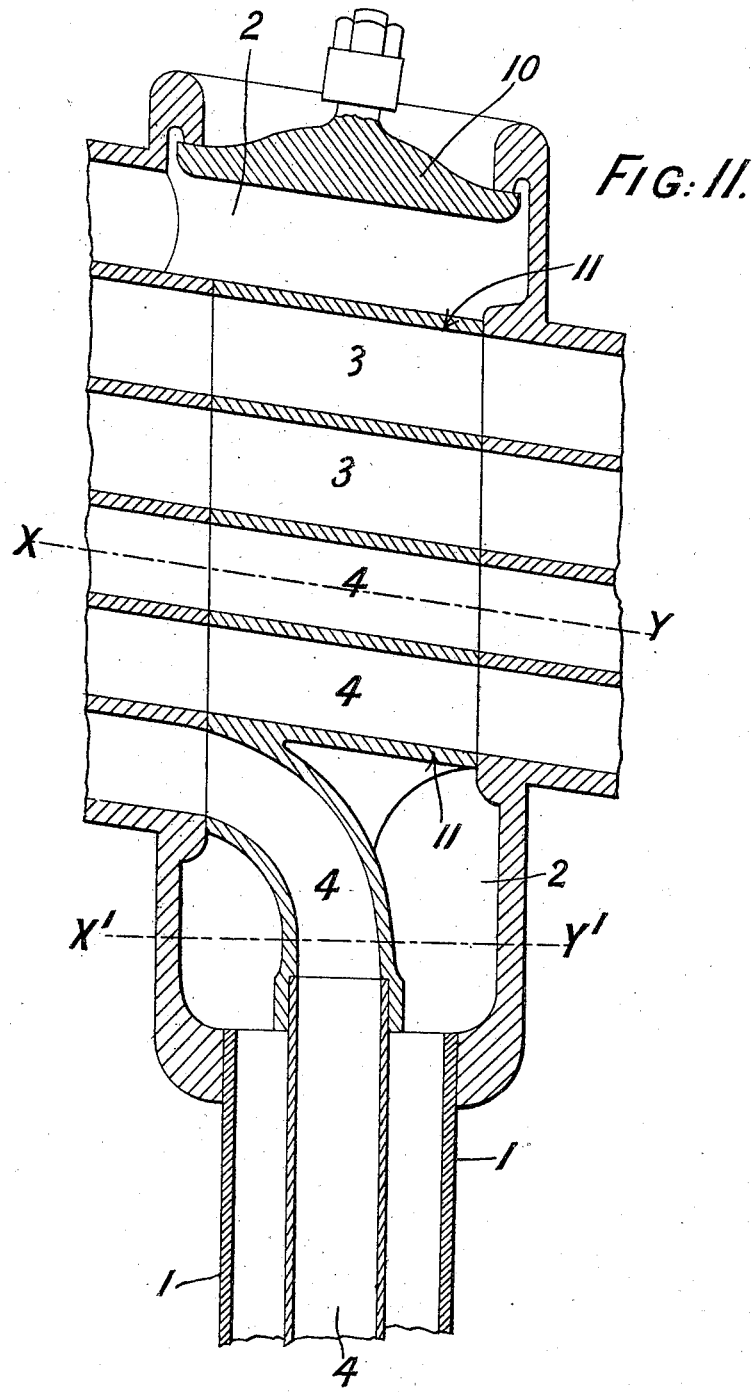

No. 706,787. Patented Aug. 12, 1902.
N. VICENTE.
WATER TUBE BOILER.
(Application filed Feb. 12, 1902.)
(No Model.) 12 Sheets—Sheet 9.

No. 706,787. Patented Aug. 12, 1902.
N. VICENTE.
WATER TUBE BOILER.
(Application filed Feb. 12, 1902.)

(No Model.) 12 Sheets—Sheet 10.

Witnesses:
J. Staib
Chas H. Smith

Inventor:
Nemesio Vicente
per L. W. Serrell & Son
Attys.

No. 706,787. Patented Aug. 12, 1902.
N. VICENTE.
WATER TUBE BOILER.
(Application filed Feb. 12, 1902.)
(No Model.) 12 Sheets—Sheet 11.

No. 706,787. Patented Aug. 12, 1902.
N. VICENTE.
WATER TUBE BOILER.
(Application filed Feb. 12, 1902.)
(No Model.) 12 Sheets—Sheet 12.
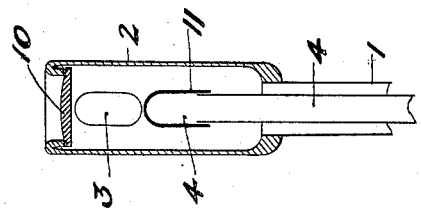
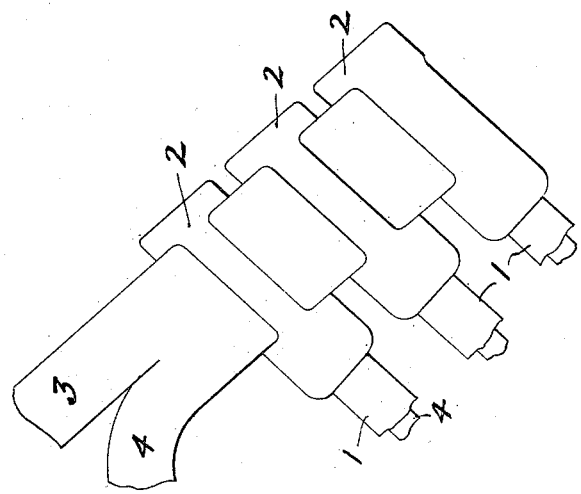
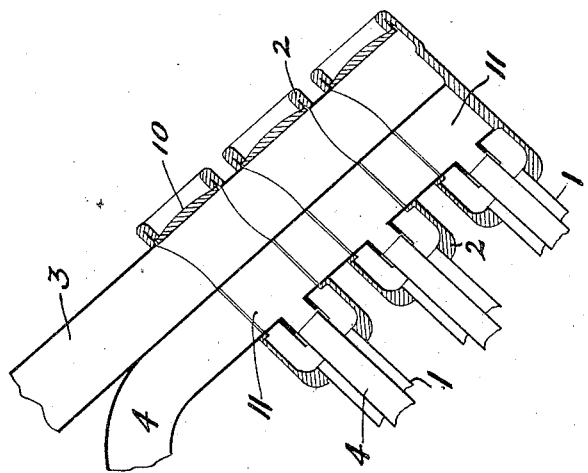

UNITED STATES PATENT OFFICE.

NEMESIO VICENTE, OF CARTAGENA, SPAIN.

WATER-TUBE BOILER.

SPECIFICATION forming part of Letters Patent No. 706,787, dated August 12, 1902.

Application filed February 12, 1902. Serial No. 93,659. (No model.)

*To all whom it may concern:*

Be it known that I, NEMESIO VICENTE, a subject of the King of Spain, and a resident of Calle de Medieras 9, Cartagena, Spain, have invented certain new and useful Improvements in Water-Tube Boilers, (for which I have made application for patent in Great Britain under No. 1,200 and dated the 16th of January, 1902,) of which the following is a specification.

This invention relates to water-tube boilers mainly consisting of a number of similar elements, each element broadly consisting of a downwardly-extending lower tube closed at its base and opening out at its upper part into a larger chamber. From the upper part of this chamber there proceeds a steam-conducting or take-off tube, while a water-feed tube enters the chamber at the lower part and extends down the lower tube, into which it supplies the feed-water. All the steam-take-off tubes of a number of these elements communicate with the upper part of a main drum or reservoir, while all the water-supply tubes of those elements communicate with the lower part of the main drum, from which the supply of fluid to each element is so conducted, while the steam is delivered from each element to the upper part of the main drum; and the invention has reference to the constructions and combinations of parts, all as hereinafter described and claimed.

The invention is now further described with reference to the accompanying drawings, whereon—

Figure 15:
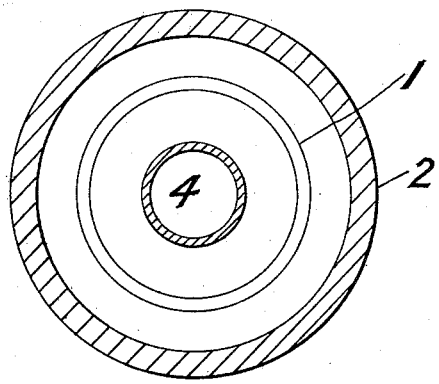
Figure 14:
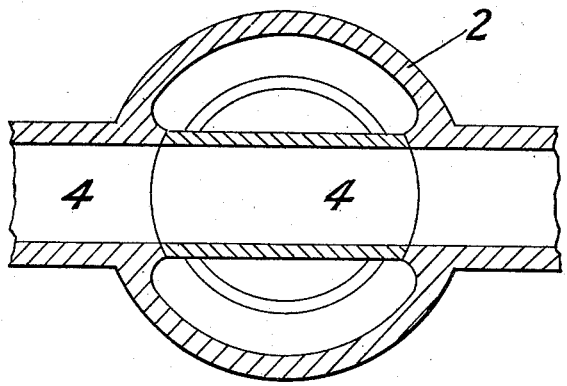
Figure 13:
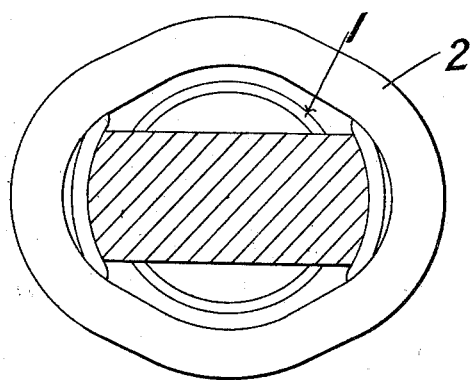
Figure 16:
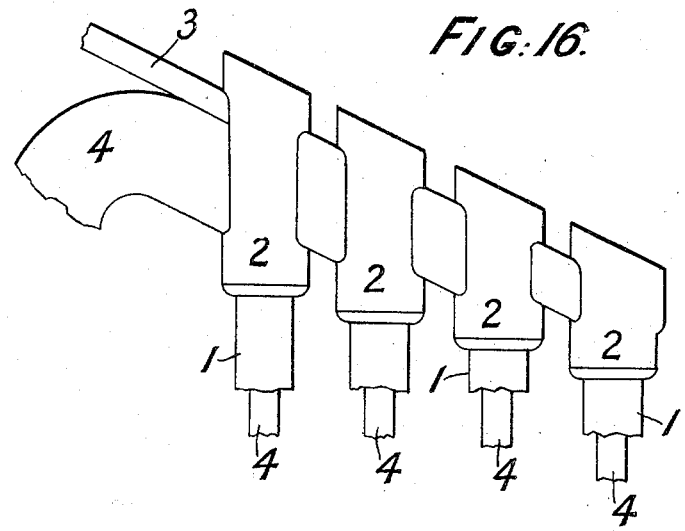
Figure 17:
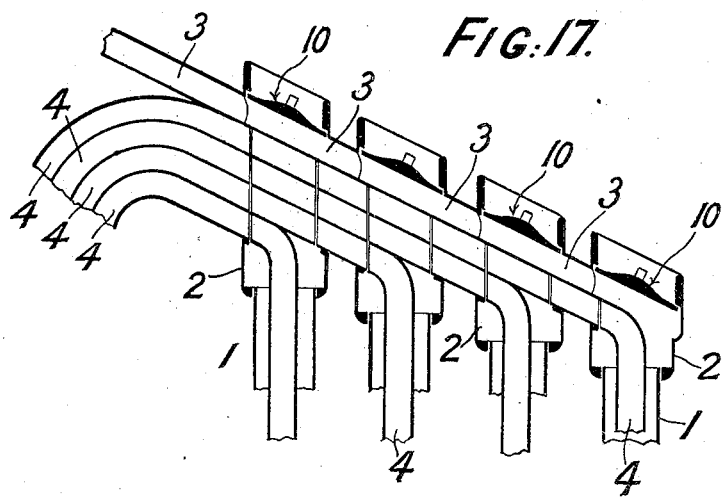

Figure 1 is a vertical section (a portion being broken away) of a single element such as before referred to, being a diagrammatic view merely illustrative of the principles of the construction. Fig. 2 shows in vertical section and plan a group of such elements. Fig. 3 is a vertical section showing the general arrangement of a water-tube boiler composed of a number of these elements, where they are arranged with the lower tubular parts in an inclined position. Fig. 4 is a vertical sectional front elevation. Fig. 5 is a sectional side elevation, and Fig. 6 is a sectional plan view where the elements are arranged in vertical position. Fig. 7 is a vertical section of a portion of one of my boilers drawn to a larger scale than the previous figures and showing the upper parts of the elements with their connections to the main drum. Fig. 8 is a plan view of Fig. 7. Fig. 9 is an elevation, and Fig. 10 is a section, of the upper ends or chambers of several of the elements, showing the connection of the steam take-off and supply tubes, where one of each is provided for each element. Fig. 11 is a vertical section of the upper portion or chamber of one of the elements, showing means for removing the fluid-supply tube from within same; and Fig. 12 is a vertical cross-section of Fig. 11. Fig. 13 is a plan with the cover removed. Fig. 14 is a section on the line X Y, and Fig. 15 is a section on the line X' Y', all of Fig. 11. Fig. 16 is an elevation of the chamber portion of a series of elements; and Fig. 17 is a vertical section of the same, illustrating an application where the chambers have a single steam take-off common to all and a separate fluid-supply tube for each chamber. Fig. 18 is an elevation. Fig. 19 is a vertical section, and Fig. 20 is a transverse section showing an arrangement where a series of chambers have a single steam-take-off tube and a single water-supply tube common to all.

In its elementary form and as shown by the diagram Fig. 1 each element consists of what I will call the "lower tube" 1, of any suitable length and which is so arranged in relation to the furnace, as hereinafter exemplified, that the heated gases of the furnace act upon the exterior of the tube. The tube 1 is arranged in either a vertical position or somewhat inclined and is closed at its lower end, while its upper end is formed with or connected to a chamber 2, which is of greater diameter than the tube 1. Connected to the upper part of the chamber (not necessarily the top, as at Fig. 1) is a take-off tube 3 for the steam, while water is supplied to the element by a tube 4, which enters the chamber at a point below the take-off tube 3 and extends down the tube 1, being open near the closed end of same, so that water is supplied into the lower end of the tube 1 and steam is taken off at or near the upper part of the chamber 2, and thus an effective circulation is established independently in each element, while each element is capable of such construction, as will hereinafter be explained, as will render it capable of ready inspection, cleaning, and renewal of its parts.

A number of elements, each of a similar construction to that just described, are arranged contiguous to each other, as I have indicated at Fig. 2, and this aggregation of elements is arranged so that the furnace-gases are caused to circulate between the lower tubes 1. Obviously the elements may be so arranged that the lower tubes can be either in an inclined position or in a vertical position, and at Fig. 3 I have shown a sectional diagram, where the lower tubes 1 of the elements are arranged in an inclined position, so that the gases from the furnace 5 pass between the said tubes. The water-feed tubes 4 of each element communicate with the lower part of the main drum 6, Fig. 3, while the steam-take-off tubes 3 communicate with the upper part of the said drum 6, and the said tubes 3 4 and the chambers 2 may be included in a casing, such as 7.

8 is a drum for collecting the mud, and 9 is the chimney from the furnace.

Figs. 4, 5, and 6, as previously stated, are diagrams showing the elements arranged vertically, and being figured to correspond with Figs. 1 to 3 will be readily understood without further description.

It is usually necessary and advantageous in the practical construction of the boiler to arrange that the interior of each chamber 2 can be conveniently inspected and also to enable the tubes supplying the elements to be removed without necessarily removing either the lower tubes 1 or the chambers 2, which parts are of course supported by a suitable framework of the boiler. At Figs. 7 and 8 there is shown a construction by which these objects can be effected, and it will be observed by reference to these figures that the upper end of each chamber 2 is provided with a removable cover 10, and there is also fitted in the interior a movable part 11, adapted to be slid into position in the interior of the chamber 2 or removed therefrom after the cover 10 has been taken away. This removable part 11 is formed so as to comprise within itself the downwardly-extending portion of the water-feed tube 4 in the extreme right-hand element of Fig. 7, while since in the construction here shown the tubes of that right-hand element pass through the left-hand element the slide part 11 of such left-hand element comprises not only a continuation of the water-feed tube 4 of that element, but also a portion of the water-feed tube of the right-hand element and a portion of the steam-take-off tube of the right-hand element. The slide part 11 need not be made to very accurately fit the interior of the chamber 2, because the object of the conducting-tubes is only to give direction to the circulation. As I have now shown, the steam-conducting tubes to the drum 6 and the water-feed tubes from that drum in passing to their respective elements may either all pass through the interiors of series of elements or may pass to each element separately.

At Figs. 9 and 10 is shown an example where each element has its own separate water-feed tube 4 and its own separate steam-take-off tube 3, and all these tubes pass through the chamber 2 of the first element of a series, one of the water-feed tubes and one of the steam-take-off tubes communicating with that first element, while the remaining steam and water tubes pass on to the next element, with which two communicate, the remaining tubes passing to the next element, and so on.

I have explained with reference to Figs. 7 and 8 that the interior of the chamber 2 is provided with a movable part 11, and this movable part when in position provides within itself continuation-passages of the tubes from one side of the chamber to another and also carries a portion of the water-feed tube 4 belonging to its own particular element. In order that this arrangement may be more clearly understood, I have further illustrated the same, upon a larger scale than the previous figures, at Figs. 11 to 15, inclusive, where the removable cover 10 of the chamber 2 is clearly shown, and when this cover 10 is taken away the part 11 can be withdrawn from within the chamber 2, bringing with it portions of the steam and water tubes 3 4. In the instance shown the part 11 brings away with it the portions of two of the steam-tubes 3 3 and two of the water-tubes 4 4, which pass through the chamber 2 on their way to the next series of elements, and it also brings away with it the continuation of the lower water-tube 4, which supplies that element shown in the figures.

The part 11, as shown in Fig. 12, is made of a somewhat tapering formation and is so fitted within the casing of the chamber 2 that it can be readily slid out. Obviously the steam-tube serving this particular chamber 2 has no connection with the part 11, but merely opens into the upper part of the said chamber 2.

With the elements hitherto dealt with each chamber 2 has been fitted with its own particular steam and water tubes 3 4; but at Figs. 16 and 17 I have shown a construction where a series of chambers 2 are served by one common steam-take-off tube 3, while the water is supplied to each element by separate supply-tubes 4 4 4, &c. The result of this arrangement is that the steam-tube 3 communicates with the first chamber 2, and the first chamber 2 is then connected with the upper part of the next chamber 2 by a tube 3, and so on.

In Figs. 18, 19, and 20 I have shown a similar arrangement, but where the water-supply is effected by a water-supply tube 4 common to a series of elements and a steam take-off is also effected by a steam-tube 3, also common to the same series of elements, and the construction will be readily understood by an inspection of these figures, where it will be seen that the movable part 11 carries a kind of T-shaped tube, the upper arms of the T when in position forming the bridging or continuation parts of the main water-tube, while the downward extension of the T-piece composes the water-supply tube leading to near the base of the lower tube 1 of the element.

What I claim as my invention, and desire to secure by Letters Patent, is—

1. In water-tube steam-boilers, the combination with a drum and a number of uniform elements each consisting of a downwardly-extending lower tube closed at its base, a chamber with which the upper end of the lower tube communicates, and a removable cover to the said chamber; of a removable slide for each chamber adapted to be slid into same, and guides in the chambers to receive the slides, water-supply tubes extending from the lower part of the drum equal in number to the elements employed, and steam-tubes extending from the upper part of the drum also equal in number to the elements employed, all the tubes from the drum entering the wall of the chamber of the first element, the slide of the first chamber being formed with steam and water conducting passages coinciding with continuation-tubes to the next element-chamber, and also carrying the downwardly-extending water-feed tube of its own chamber, the removable slide of the second chamber carrying the water-supply tube therefor and communicating passages for the next chamber and so on, a furnace, and means for supporting the elements in position so that the furnace-gases pass between the lower tubes of the elements, substantially as set forth.

2. In water-tube steam-boilers, the combination with a furnace, a main drum, a number of uniform elements each consisting of a downwardly-extending lower tube closed at its base, a chamber with which the upper end of the lower tube communicates and a removable cover to the chamber, with means for supporting series of the elements in position so that the furnace-gases pass between the lower tubes of the elements; of a single steam-conducting tube passing from the drum and extending to the chamber of the first element of a series, and so on from chamber to chamber of the elements to collect the steam from all the chambers, and a number of water-feed tubes equal to the number of chambers, the water-tubes extending from the drum and entering the first chamber of a series, a removable slide in each chamber, and passages in the slide connecting all the tubes but one with corresponding tubes passing from the first chamber to the second, and a tube carried by the slide extending into the lower tube of the element and corresponding with the remaining water-tube from the drum, and by which the first element is supplied with water, the second being supplied in like manner and so on, substantially as set forth.

3. In water-tube steam-boilers, the combination with a furnace, a main drum, a number of uniform elements each consisting of a downwardly-extending lower tube closed at its base, a chamber with which the upper end of the lower tube communicates, and a removable covering to the chamber, with means for supporting series of the elements in position so that the furnace-gases pass between the lower tubes of the elements; of a steam-conducting tube passing from the drum and extending to the chamber of the first element of a series and so on from chamber to chamber of the elements to collect the steam from all the chambers, and a common water-feed tube extending from the lower part of the drum and extending to the first chamber of a series and so on from chamber to chamber of the elements; a removable slide in each chamber, a passage in the slide connecting the water-feed tube upon one side of the chamber with the continuation of the water-feed tube upon the other side of the chamber leading to the next, and a branch from the slide-passage extending into the lower tube of the element to supply water thereto, substantially as set forth.

NEMESIO VICENTE.

Witnesses:
T. W. ROGERS,
WM. W. MARSHALL.